United States Patent
Oas

(10) Patent No.: US 10,131,049 B1
(45) Date of Patent: Nov. 20, 2018

(54) DOUBLE WIDE SHOCK-ABSORBING HANDLE FOR TOOLS

(71) Applicant: Steven M. Oas, Erie, PA (US)

(72) Inventor: Steven M. Oas, Erie, PA (US)

( * ) Notice: Subject to any disclaimer, the term of this patent is extended or adjusted under 35 U.S.C. 154(b) by 0 days.

(21) Appl. No.: 15/603,993

(22) Filed: May 24, 2017

(51) Int. Cl.
| | | |
|---|---|---|
| *B25G 1/10* | (2006.01) | |
| *B25G 1/01* | (2006.01) | |
| *F16F 1/36* | (2006.01) | |
| *E01H 5/12* | (2006.01) | |

(52) U.S. Cl.
CPC .............. *B25G 1/01* (2013.01); *E01H 5/12* (2013.01); *F16F 1/36* (2013.01)

(58) Field of Classification Search
CPC ... Y10T 16/513; Y10T 16/4713; Y10T 16/48; B25G 1/01; B25G 1/02; B25G 17/043; B25G 17/04; B25G 17/24; B25F 5/006; A01B 1/02; E01H 5/12; E01H 5/02; F16F 1/36

See application file for complete search history.

(56) References Cited

U.S. PATENT DOCUMENTS

| | | | | |
|---|---|---|---|---|
| 483,477 | A * | 9/1892 | Ryan .................. | B25G 3/02 16/430 |
| 2,456,267 | A * | 12/1948 | Gazda ................ | B25D 17/043 16/431 |
| 3,322,211 | A * | 5/1967 | Alabuzhev ........... | B25D 17/043 173/162.2 |
| 4,401,167 | A * | 8/1983 | Sekizawa ............ | B25D 17/043 173/162.1 |
| 4,478,293 | A * | 10/1984 | Weilenmann ........ | B25D 17/043 173/162.2 |
| 6,131,972 | A * | 10/2000 | Whitehead ........... | B25G 1/102 16/430 |
| 6,145,899 | A * | 11/2000 | Kelemen .............. | A01B 1/00 294/57 |
| 6,148,930 | A * | 11/2000 | Berger ................. | B25D 17/043 173/162.2 |
| 6,446,421 | B1 * | 9/2002 | Kramer ................ | F02B 63/02 30/381 |
| 6,578,231 | B1 * | 6/2003 | Godshaw .............. | A45F 5/10 16/114.1 |
| 7,076,838 | B2 * | 7/2006 | Meixner ............... | B25D 17/043 16/430 |
| 7,287,601 | B2 * | 10/2007 | Hellbach ............. | B25D 17/043 16/110.1 |
| 7,350,839 | B2 * | 4/2008 | Marquardt ............ | A01B 1/02 294/57 |
| 8,584,769 | B2 * | 11/2013 | Friedrich ............ | B25D 17/043 16/431 |
| 2003/0116982 | A1 * | 6/2003 | Nicolay ................ | B25G 1/00 294/57 |
| 2004/0040729 | A1 * | 3/2004 | Meixner ............... | B25D 17/043 173/162.2 |

(Continued)

*Primary Examiner* — Chuck Y Mah
(74) *Attorney, Agent, or Firm* — Richard K Thomson

(57) ABSTRACT

A C-shaped element wide enough to be engaged by two adult-sized hands is attached to the upper ends of a Y-shaped yoke using two pistons which engage dual elastomeric springs to permit the shock of the impact endured by the attached tool to be abated. The C-shaped element is arcuate to allow the hands to work more effectively in tandem and to allow the force lines to be directly up and down the arms of the user.

3 Claims, 4 Drawing Sheets

(56) References Cited

U.S. PATENT DOCUMENTS

| | | | | |
|---|---|---|---|---|
| 2010/0025062 | A1* | 2/2010 | Engelfried | B25D 17/043 173/162.2 |
| 2010/0206594 | A1* | 8/2010 | Meixner | B25D 17/043 173/162.2 |
| 2011/0173778 | A1* | 7/2011 | Wales | B25G 3/20 16/426 |
| 2014/0260839 | A1* | 9/2014 | Hurley | B25F 5/006 81/489 |
| 2016/0236339 | A1* | 8/2016 | Flaherty | B25G 1/01 |
| 2016/0374256 | A1* | 12/2016 | Chou | B25G 3/12 172/1 |
| 2017/0297191 | A1* | 10/2017 | Chou | B25G 1/06 |

\* cited by examiner

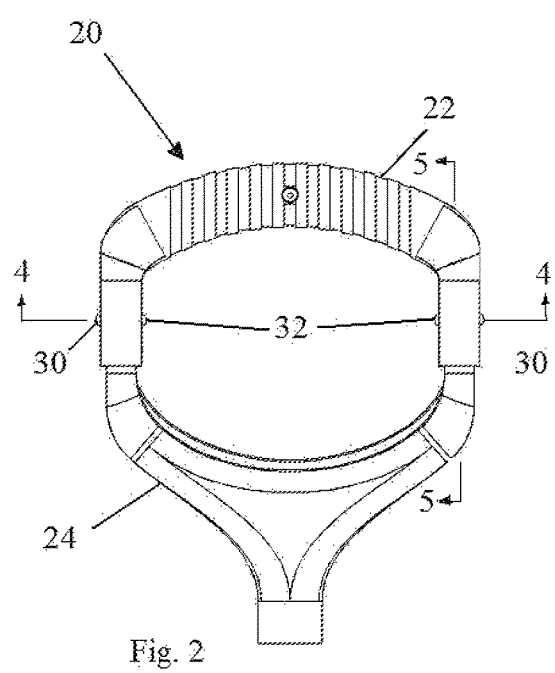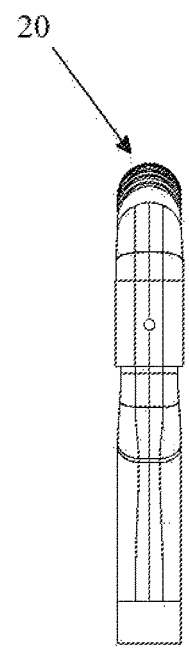
Fig. 2
Fig. 3

DOUBLE WIDE SHOCK-ABSORBING HANDLE FOR TOOLS

BACKGROUND AND SUMMARY OF THE INVENTION

Hand implements such as ice scrapers, and snow and garden shovels, roof shingle spades, and the like, exact a toll on the hands and arms of the user, the vibrational energy created by repeated impacts can cause muscular distress such as carpel tunnel, and the like. Applicant owns a similar system used on a conventional handle for alleviating impact that it markets on shovels in conjunction with U.S. Pat. No. 6,145,899 under the trademark Shock Shield™ handle. The problems can be exacerbated by an enlarged tool blade. While beneficial to reducing the times the tool needs to be used to impact the offending ice patch, the larger surface increases the actual force necessary and, therefore, the force transmitted into the hands and arms of the user.

A solution for such issues is provided by introducing a shock absorber/spring system in the path between the blade and the handle so as to reduce the amount of vibrational energy actually communicated to the hands and arms of the user, in essence, short circuiting the transmission path. The present invention provides an enlarged handle to facilitate the manipulation of the impact tool and to distribute the load between the user's two hands, effectively, halving the impact. This "sharing of the load", in conjunction with the shock absorption effected by the spring, significantly lessens the negative impact on the musculature of the user. Lastly, the arcuate handle allows better alignment of the wrists and hands of the user enabling them to work in concert and have the impulse forces extend directly down (and the resultant impact forces, directly up) the arm bones rather than have the hands angled "off-line" causing greater stress on the wrist and elbow joints.

The present invention comprises a shock-reduction system for a hand-held impact tool for chipping ice, snow and the like, the hand-held impact tool including an extended blade for engaging the ice, snow, and the like, said shock reduction system comprising a) a C-shaped handle having a width adequate to accommodate two adult-sized hands; b) a shaft extending between the C-shaped handle and the extended blade defining a primary axis; c) a Y-shaped yoke connecting the handle to a shaft, the shaft extending between the yoke and the extended blade; d) a spring means positioned in a load path, the load path extending between the extended blade and the C-shaped handle, the spring means absorbing a significant portion of an impact force transmitted from the blade through the shaft into the handle through the Y-shaped yoke. The spring means comprises an elastomeric spring in each arm of the Y-shaped yoke. The handle has an arcuate configuration to permit better alignment between the user's wrists and hands, and provide a non-axial, inward force component serving to unify a user's two hands. The arcuate configuration of the handle has a radius of curvature between 5" and 8" and, more preferably about 6.5".

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which

FIG. 2 is an enlarged front view of the first embodiment of the shock-absorbing handle;

FIG. 3 is a side view of the first embodiment with a portion broken away;

DETAILED DESCRIPTION OF THE PREFERRED EMBODIMENT(S)

Figure 1:
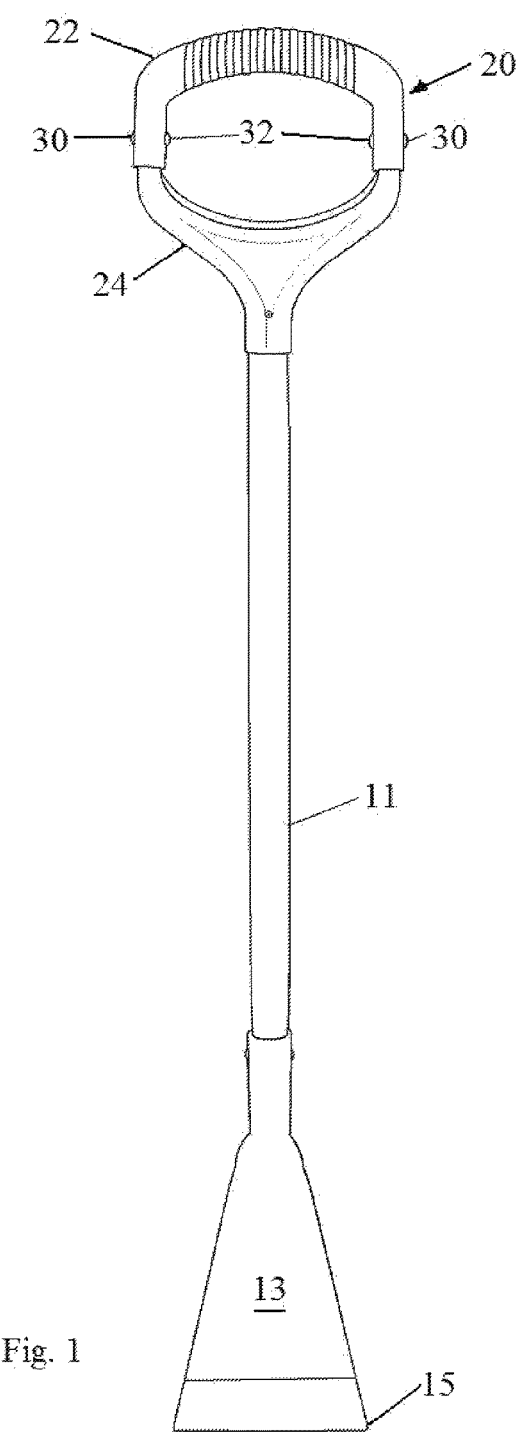
FIG. 1 is a front view of the first embodiment of the shock-absorbing handle shown mounted on an ice scraper.
Figure 4:
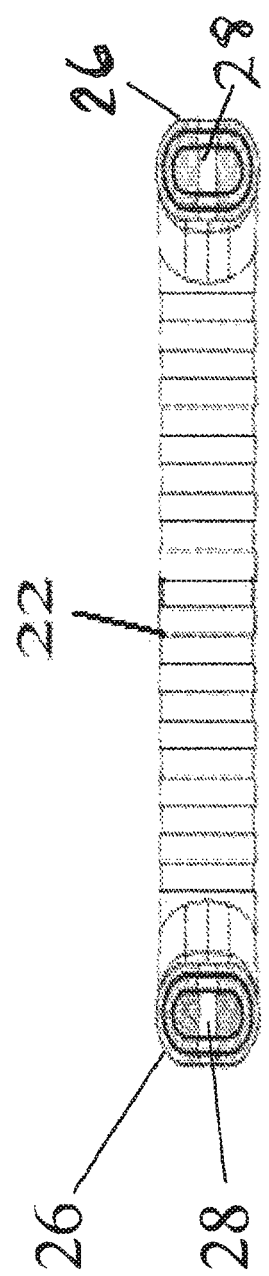
FIG. 4 is a cross-sectional end view taken on line 4-4 of FIG. 2.

A first embodiment of the shock-absorbing handle of the present invention is depicted in FIGS. 1-3 generally at 20. Handle 20 comprises a C-shaped element 22 which slides over the ends of Y-shaped yoke 24. C-shaped element 22 has a width sufficient to accommodate two adult-sized hands, for example, on the order of 8.25" across (9 5/16" around) the handle and has a radius of curvature falling in the range of between 5" and 8". This radiusing of C-shaped element 22 allows 1) the user's hands to work in concert and, 2) the hands, wrists and arms to maintain a linearity which reduces the potential for damaging the wrists and elbows of the user.

Figure 5:
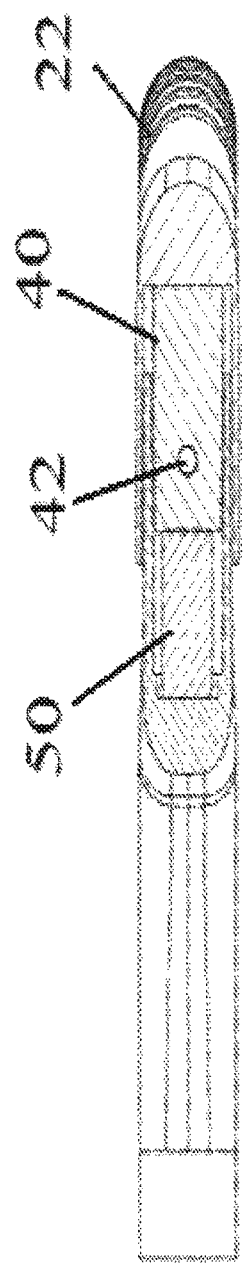
FIG. 5 is a cross-sectional side view taken on line 5-5 of FIG. 2.
Figure 6A:
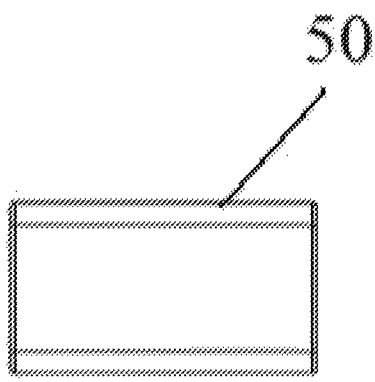
FIG. 6A is an enlarged side view of the elastomeric spring of the present invention; and, FIG. 6B is an end view of the elastomeric spring of FIG. 6A.
Figure 6B:
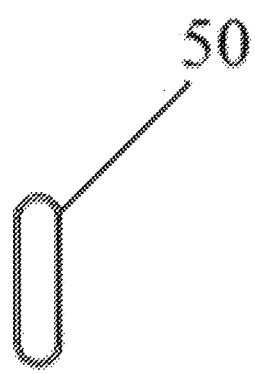

As best seen in FIG. 3, each arm 26 of yoke 24 has an elongated slot 28 therein which receives a married screw 30 and threaded socket 32. In addition, screw 30 and socket 32 combination traverse throughbore 42 in plunger 40. As depicted in FIG. 5, plunger 40 compresses elastomeric spring 50, best seen in FIGS. 6A and 6B. The A scale shore durometer of the spring 50 preferably falls in the range between 42 and 48, most preferably 45. Spring 50 mitigates the impact of the forces transmitted from the edge 15 of ice scraper blade 13 through shaft 11 into C-shaped element 22 and, hence, into the hands and arms of the user. The radius of curvature allows the forces to travel directly up the arms rather than through a cocked wrist. The radius has a secondary purpose of allowing the two hands to work more effectively in tandem.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

I claim:

1. A shock-reduction system for a hand-held impact tool such as tools for chipping ice and snow, the hand-held impact tool including an extended blade for engaging the ice and snow, said shock reduction system comprising:
   a) a C-shaped handle having a width adequate to accommodate two adult-sized hands and a radius of curvature between 5" and 8" to permit better alignment between said user's wrists and hands, and provide a non-axial, inward force component to unify a user's hands;
   b) a Y-shaped yoke connecting said C-shaped handle to a shaft, said shaft extending between said yoke and the extended blade and defining a primary axis;
   c) a spring means positioned between the extended blade and said handle, said spring means absorbing a significant portion of an impact force conducted from said blade through said shaft into said handle through said Y-shaped yoke.

2. The shock-reduction system of claim 1 wherein said spring means comprises an elastomeric spring in each arm of said Y-shaped yoke.

3. The shock-reduction system of claim 1 wherein said radius of curvature of said handle is most preferably 6.5".

* * * * *